US012654511B2

(12) United States Patent
Yeon et al.

(10) Patent No.: US 12,654,511 B2
(45) Date of Patent: Jun. 16, 2026

(54) VALVE APPARATUS AND INTEGRATED THERMAL MANAGEMENT SYSTEM USING SAME

(71) Applicant: HYUNDAI WIA Corporation, Changwon-si (KR)

(72) Inventors: Je Min Yeon, Incheon (KR); Man Hee Kim, Seoul (KR); Sang Min Lee, Hwaseong-si (KR)

(73) Assignee: HYUNDAI WIA Corporation, Changwon-si (KR)

( * ) Notice: Subject to any disclaimer, the term of this patent is extended or adjusted under 35 U.S.C. 154(b) by 232 days.

(21) Appl. No.: 18/188,226

(22) Filed: Mar. 22, 2023

(65) Prior Publication Data

US 2023/0302873 A1     Sep. 28, 2023

(30) Foreign Application Priority Data

Mar. 23, 2022    (KR) .................. KR10-2022-0036079

(51) Int. Cl.
B60H 1/00        (2006.01)
B60H 1/32        (2006.01)
F16K 11/085      (2006.01)

(52) U.S. Cl.
CPC ..... B60H 1/00485 (2013.01); B60H 1/00278 (2013.01); B60H 1/00385 (2013.01);
(Continued)

(58) Field of Classification Search
CPC ............ B60H 1/00278; B60H 1/00385; B60H 1/00485; B60H 1/00885; B60H 1/00921;
(Continued)

(56) References Cited

U.S. PATENT DOCUMENTS

2014/0374081 A1    12/2014    Kakehashi et al.
2020/0189357 A1     6/2020    Chopard et al.

FOREIGN PATENT DOCUMENTS

DE      112013000833 T5    10/2014
DE      112014001830 T5    12/2015
(Continued)

OTHER PUBLICATIONS

1st Office Action in German Application No. DE 10 2023107 221.8, date of Issue, Jun. 5, 2024, 27 pages.
(Continued)

*Primary Examiner* — Jonathan Bradford
(74) *Attorney, Agent, or Firm* — Knobbe, Martens, Olson & Bear, LLP

(57)             ABSTRACT

A valve apparatus and an integrated thermal management system using the same are proposed. In the valve apparatus and the integrated thermal management system, a plurality of coolant circuits is integrated with one valve to be compactified, so that it is advantageous in terms of manufacturing and utilization of space is improved while being compactified. Furthermore, as heat exchange between a coolant circulated in each coolant line and a refrigerant circulated in each refrigerant line is performed in response to various thermal management modes, the efficiency of the thermal management including cooling of an electric part and a battery, and indoor heating using waste heat of the electric part and the battery is improved, thereby securing a traveling distance of an electrified mobility.

15 Claims, 15 Drawing Sheets

| Stem | Stem rotating angle | 0 degree | |
|---|---|---|---|
| | Section | First section | Second section |
| | Coolant flow | *(figure: coolant flow diagram, labels 120, 110, 100, 140, 150, 200, 160, 130)* | *(figure: coolant flow diagram, labels 100, 140, 150, 200, 160)* |

(52) U.S. Cl.
  CPC ..... *B60H 1/00885* (2013.01); *B60H 1/00921* (2013.01); *B60H 1/32284* (2019.05); *F16K 11/0856* (2013.01); *B60H 2001/00307* (2013.01); *B60H 2001/00928* (2013.01); *B60H 2001/00935* (2013.01)

(58) Field of Classification Search
  CPC ...... B60H 1/32284; B60H 2001/00307; B60H 2001/00928; B60H 2001/00935
  See application file for complete search history.

(56) References Cited

FOREIGN PATENT DOCUMENTS

| | | | |
|---|---|---|---|
| JP | 2017-207157 | A | 11/2017 |
| KR | 10-2014-0147365 | A | 12/2014 |
| KR | 10-2021-0053592 | A | 5/2021 |
| KR | 10-2022-0014673 | A | 2/2022 |
| KR | 10-2022-0016652 | A | 2/2022 |

OTHER PUBLICATIONS

Office Action dated Oct. 20, 2023 in Korean Application No. 10-2022-0036079.
Notice of Allowance received in Korean Application No. 10-2022-0036079 dated Apr. 9, 2024.
Office Action in corresponding CN Application No. 202310290438.7 dated Apr. 1, 2026.

| Stem rotating angle | 0 degree | |
|---|---|---|
| Section | First section | Second section |
| Coolant flow | | |

| Stem rotating angle | 270 degree | |
| Section | First section | Second section |
| Coolant flow | | |

Stem

VALVE APPARATUS AND INTEGRATED THERMAL MANAGEMENT SYSTEM USING SAME

CROSS REFERENCE TO RELATED APPLICATION

The present application claims priority to Korean Patent Application No. 10-2022-0036079, filed Mar. 23, 2022, the entire contents of which is incorporated herein for all purposes by this reference.

FIELD

Background

The present disclosure relates generally to a valve apparatus and an integrated thermal management system using the same. disclosure

Description of the Related Art

Recently, due to environmental issues of internal combustion engine vehicles, electric vehicles, etc., are being widely used as eco-friendly vehicles. However, in the case of an existing internal combustion engine vehicle, indoor heating using waste heat of an engine thereof can be performed, so there is no need for separate energy for indoor heating, but in the case of an electric vehicle and the like, since there is no engine and no heat source, indoor heating may need to be performed using separate energy, so fuel efficiency of the electric vehicle is reduced. for the reasons discussed above, the driving range of the electric vehicle is shortened and inconvenience, such as the need for frequent charging is caused.

The foregoing is intended merely to aid in the understanding of the background of the present disclosure, and is not intended to mean that the present disclosure falls within the purview of the related art that is already known to those skilled in the art.

SUMMARY

Aspects of the present disclosure provide a valve apparatus and an integrated thermal management system using the same, which are configured to integrate a plurality of coolant circuits with one valve to be compactified, and to secure the efficiency in response to various thermal management modes including cooling of an electric part and a battery, and indoor heating using waste heat of the electric part and the battery.

Embodiments of the present disclosure provide a valve apparatus and an integrated thermal management system using the same, and the apparatus and the system are configured to integrate a plurality of coolant lines with one valve to be compactified, and to secure the efficiency in response to various thermal management modes including cooling of an electric part and a battery, and indoor heating using waste heat of the electric part and the battery.

According to embodiments of the present disclosure, a valve apparatus including: a housing having an internal space, and of which a circumferential surface is divided into a first section and a second section and each of the first section and the second section has a plurality of ports; a stem rotatably provided in the internal space of the housing, and having a plurality of first flow paths matching with the plurality of ports of the first section, a plurality of second flow paths matching with the plurality of ports of the second section, and a communication part allowing the plurality of ports of the first section and the plurality of ports of the second section to communicate with each other; an actuator provided at the housing and configured to control a rotating position of the stem; and a seal interposed between the housing and the stem, and having a plurality of through holes matching with the plurality of first flow paths, the plurality of second flow paths, and the communication part of the stem.

Each port of the housing may include, in the first section, a first port connected to a reservoir at an electric part, a second port connected to a reservoir at a battery, and a third port connected to a battery chiller, and in the second section, a fourth port and a fifth port respectively connected to an inlet and an outlet of a radiator, and a sixth port connected to an electric part heat exchanger.

In response to the rotating position of the stem, the plurality of first flow paths may be configured to be opened to the third port in normal time and to be selectively opened to any one of the first port and the second port, and in the first section, the communication part may be configured to be opened to a remaining port of the first port and the second port.

In response to the rotating position of the stem, the plurality of second flow paths may be configured to be opened to the sixth port in normal time and to be selectively opened to the fourth port and the fifth port, and in the second section, the communication part may be configured to be selectively opened to the first port or the second port.

The seal may be divided into a first seal and a second seal, and an area of each of the through holes may be formed larger than an area of the plurality of first flow paths, an area of the plurality of second flow paths, and an area of the communication part.

An integrated thermal management system using a valve apparatus may include: a first coolant line in which a coolant may be circulated, and including a reservoir at an electric part, a first water pump, an electric part, and an electric part heat exchanger; a second coolant line in which the coolant is circulated, a reservoir at a battery, a second water pump, a battery, and a battery chiller; a third coolant line branching from the first coolant line, and including a radiator; a refrigerant line in which a refrigerant may be circulated, including a compressor, an outdoor condenser, an expander, and an evaporator, and connected to the electric part heat exchanger and the battery chiller to allow heat exchange between the refrigerant and the coolant; a refrigerant valve provided in rear of the outdoor condenser in the refrigerant line and allowing the refrigerant to be selectively distributed into the battery chiller and the compressor; and the valve apparatus configured to selectively change a distribution direction of the coolant distributed in the first coolant line, the second coolant line, and the third coolant line to control a flow of the coolant.

The refrigerant line may include an indoor condenser between the compressor and the electric part heat exchanger.

The expander of the refrigerant line may have a plurality of expanders including a first expander between the indoor condenser and the electric part heat exchanger, a second expander between the outdoor condenser and the battery chiller, and a third expander located before the evaporator.

The valve apparatus may be configured to change a distribution direction of the coolant at a merging point of the first coolant line and the second coolant line into the reservoir at the electric part, the reservoir at the battery, the electric part heat exchanger, and the battery chiller, and to allow the coolant passing through the electric part heat exchanger to be distributed into or bypass the radiator at a merging point of the first coolant line and the third coolant line.

The integrated thermal management system may include: a controller configured to control the valve, each of the water pumps, the compressor, and each of the expanders in response to a thermal management mode.

When cooling the electric part with external air, the controller may operate the first water pump, and control the valve apparatus to allow the coolant to be circulated into each of the first coolant line and the second coolant line, and to allow the coolant to be distributed into the radiator.

When cooling the battery, the controller may operate the second water pump, and with the compressor being operated, control the refrigerant valve to allow the refrigerant to be distributed into the battery chiller, and control the first expander to be opened and the second expander to perform expanding operation.

When cooling an indoor space, the controller may control the third expander to perform expanding operation.

When cooling the battery and the electric part by external air, the controller may operate the first water pump and the second water pump, and control the valve apparatus to allow the coolant passing through the battery and the battery chiller to be distributed into the electric part and the electric part heat exchanger, and to allow the coolant to be distributed into the radiator.

When recovering waste heat of the electric part to heat an indoor space, the controller may operate the first water pump, and control the valve apparatus to allow the coolant to be circulated into each of the first coolant line and the second coolant line, and to allow the coolant to bypass the radiator, and with the compressor being operated, the controller may control the first expander to expand, and the second expander and the third expander to be closed.

When cooling the battery and heating the indoor space, the controller may stop operation of the first water pump, and operate the second water pump.

When heating an indoor space by using waste heat of the electric part and the battery, the controller may operate the first water pump and the second water pump, and control the valve apparatus to allow the coolant passing through the battery and the battery chiller to be distributed into the electric part and the electric part heat exchanger, and with the compressor being operated, the controller may control the first expander to perform expanding operation, and control the refrigerant valve to allow the refrigerant passing through the condenser to pass through the battery chiller to be distributed into the compressor.

The valve apparatus having the above-described structure and the thermal management module using the same are configured such that the plurality of coolant circuits is integrated with the one valve to be compactified, so that the valve apparatus and the thermal management module are advantageous in terms of manufacturing and are improved in utilization of space while being compactified.

Furthermore, by heat exchange between the coolant circulated in each coolant line and the refrigerant circulated in the refrigerant line performed in response to various thermal management modes, the efficiency of thermal management including cooling of the electric part and the battery, and heating of the indoor space by using waste heat of the electric part and the battery is improved, thereby securing a traveling distance of an electrified mobility.

BRIEF DESCRIPTION OF THE DRAWINGS

FIG. 2 is an assembly view showing the valve apparatus shown in FIG. 1.

FIG. 9 is a view showing the valve apparatus according to the thermal management mode shown in FIG. 8.

FIG. 11 is a view showing the valve apparatus according to the thermal management mode shown in FIG. 10.

FIG. 13 is a view showing the valve apparatus according to the thermal management mode shown in FIG. 12.

FIG. 15 is a view showing the valve apparatus according to the thermal management mode shown in FIG. 14.

DETAILED DESCRIPTION OF EMBODIMENTS

Hereinbelow, a valve apparatus and a thermal management module using the same according to an embodiment of the present disclosure will be described with reference to accompanying drawings.

Meanwhile, due to the electrification of vehicles, not only the indoor space of a vehicle, but also thermal management needs of electric parts such as a high voltage battery and a motor are added. In other words, in the case of electric vehicles, needs of each air conditioning for the indoor space, battery, and electric part are different, and it may be necessary to have a technique that can save energy as much as possible through independent response to each air conditioning and efficient collaboration between air conditionings.

Accordingly, a concept of integrated thermal management of a vehicle is proposed, and the integrated thermal management is intended to increase thermal efficiency by performing thermal management independently for each part and at the same time integrating thermal management of the entire vehicle.

In order to perform the integrated thermal management of a vehicle, it may be necessary to integrate and modularize complex coolant lines and parts, and the concept of modularization is needed not only for modularization of a plurality of parts, but also for simplification of manufacturing and compact package.

Furthermore, in electrified vehicles, it may be necessary to have a technology to improve mileage and indoor heating and cooling performance by securing energy efficiency by using waste heat of parts such as electric parts and a battery that generate heat.

Figure 1:
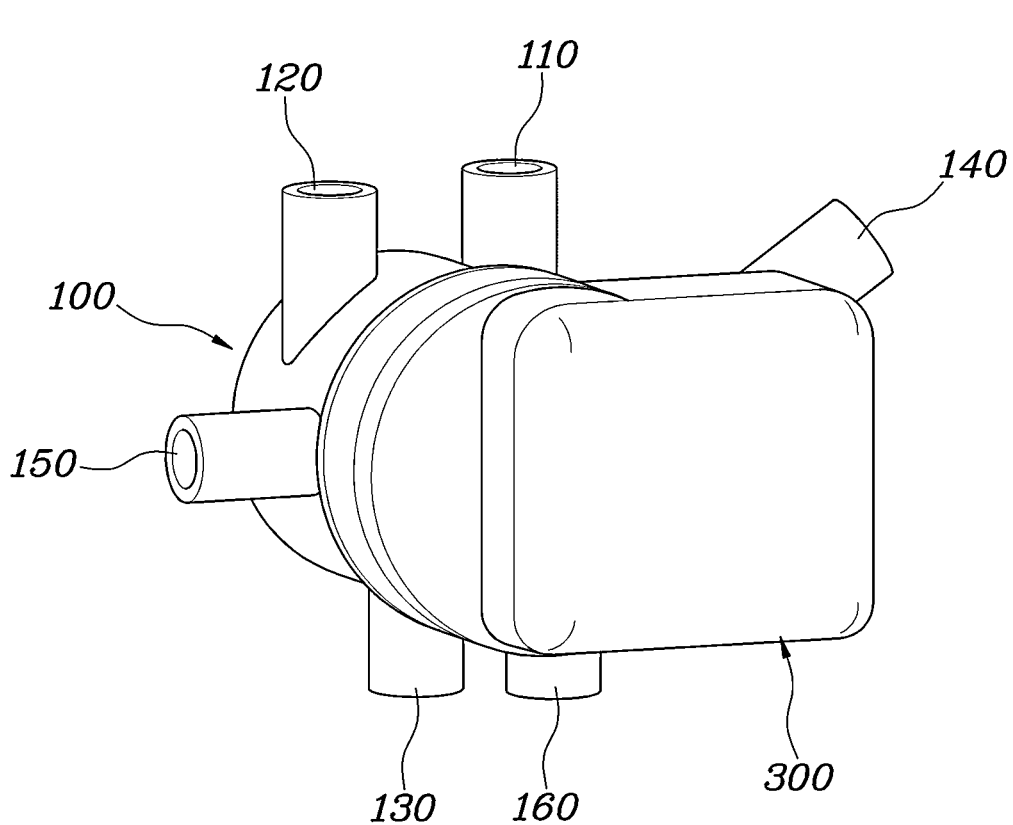
FIG. 1 is a view showing a valve apparatus according to embodiments of the present disclosure.
Figure 2:
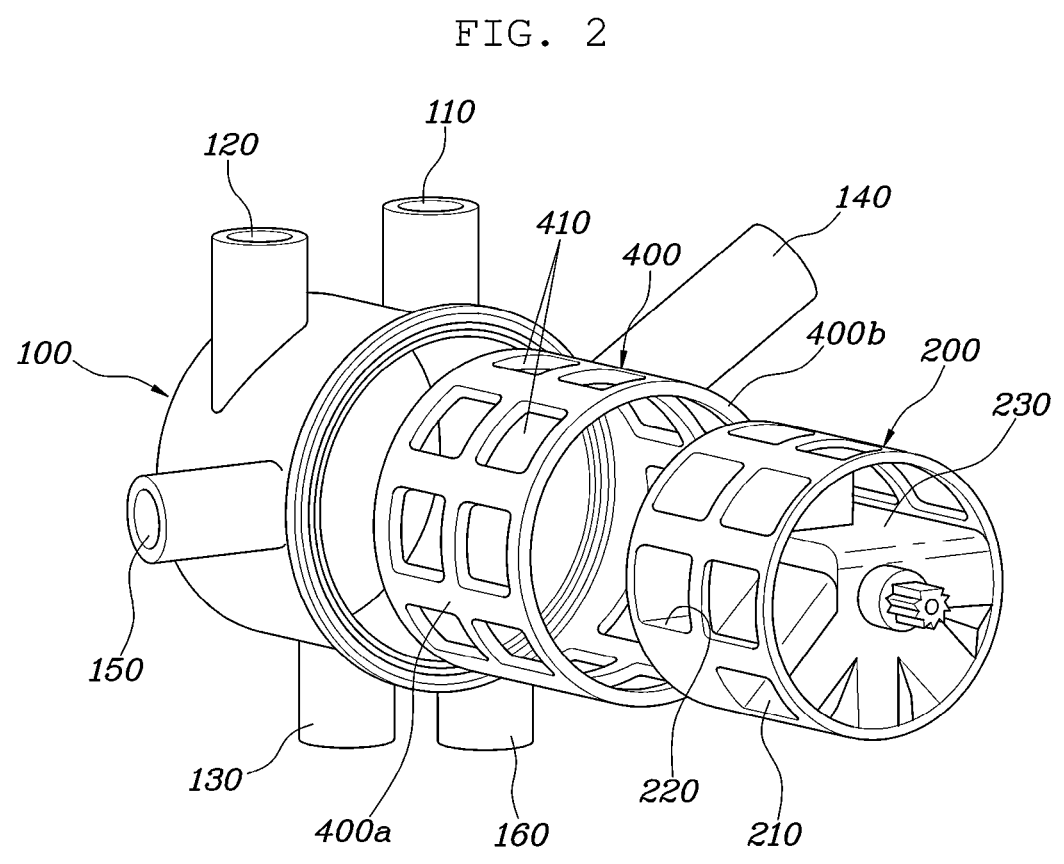
Figure 3:
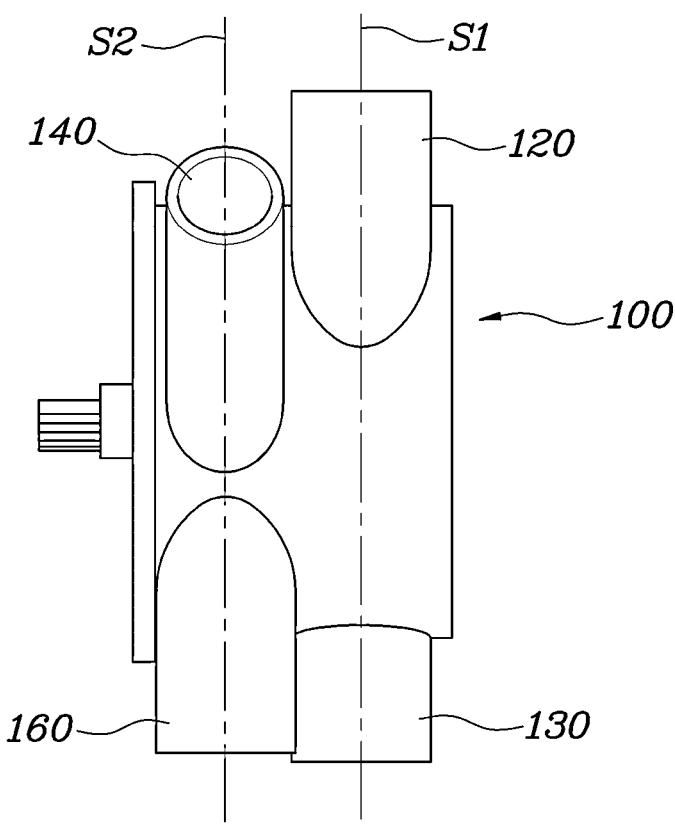
FIG. 3 is an upper view showing the valve apparatus shown in FIG. 1.
Figure 4:
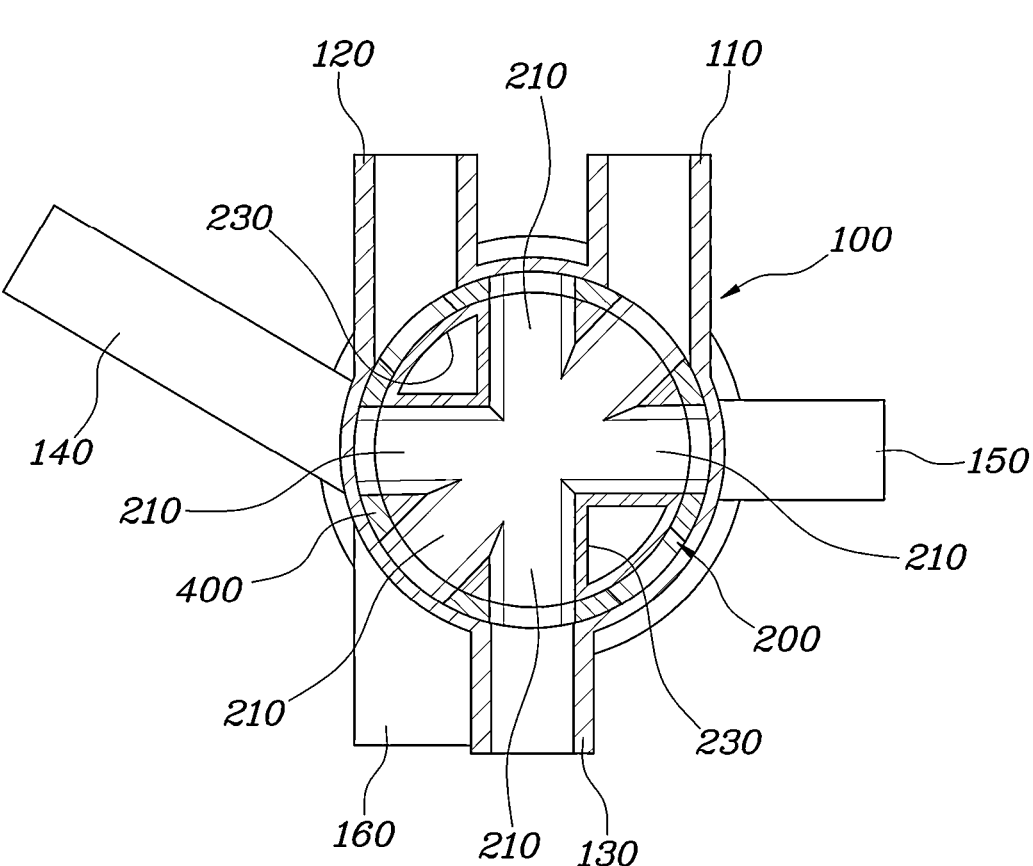
FIG. 4 is a sectional view according to a first section of the valve apparatus shown in FIG. 1.
Figure 5:
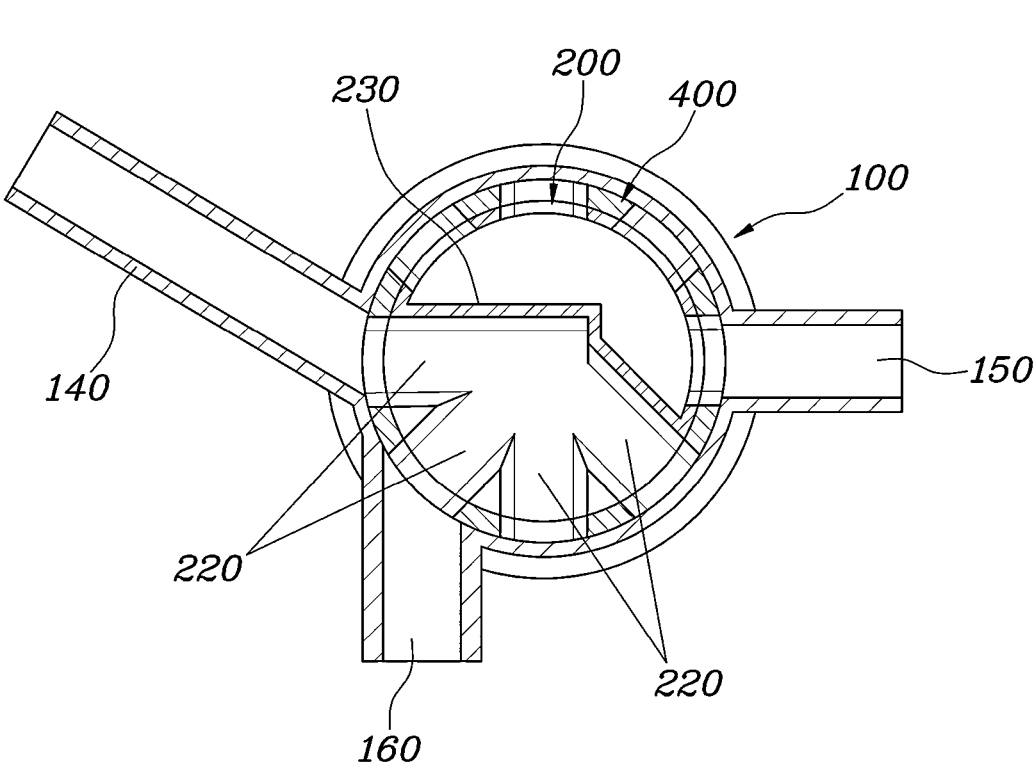
FIG. 5 is a sectional view according to a second section of the valve apparatus shown in FIG. 1.

FIG. 1 is a view showing a valve apparatus according to embodiments of the present disclosure. FIG. 2 is an assembly view showing the valve apparatus shown in FIG. 1. FIG. 3 is an upper view showing the valve apparatus shown in FIG. 1. FIG. 4 is a sectional view according to a first section of the valve apparatus shown in FIG. 1. FIG. 5 is a sectional view according to a second section of the valve apparatus shown in FIG. 1.

Figure 6:
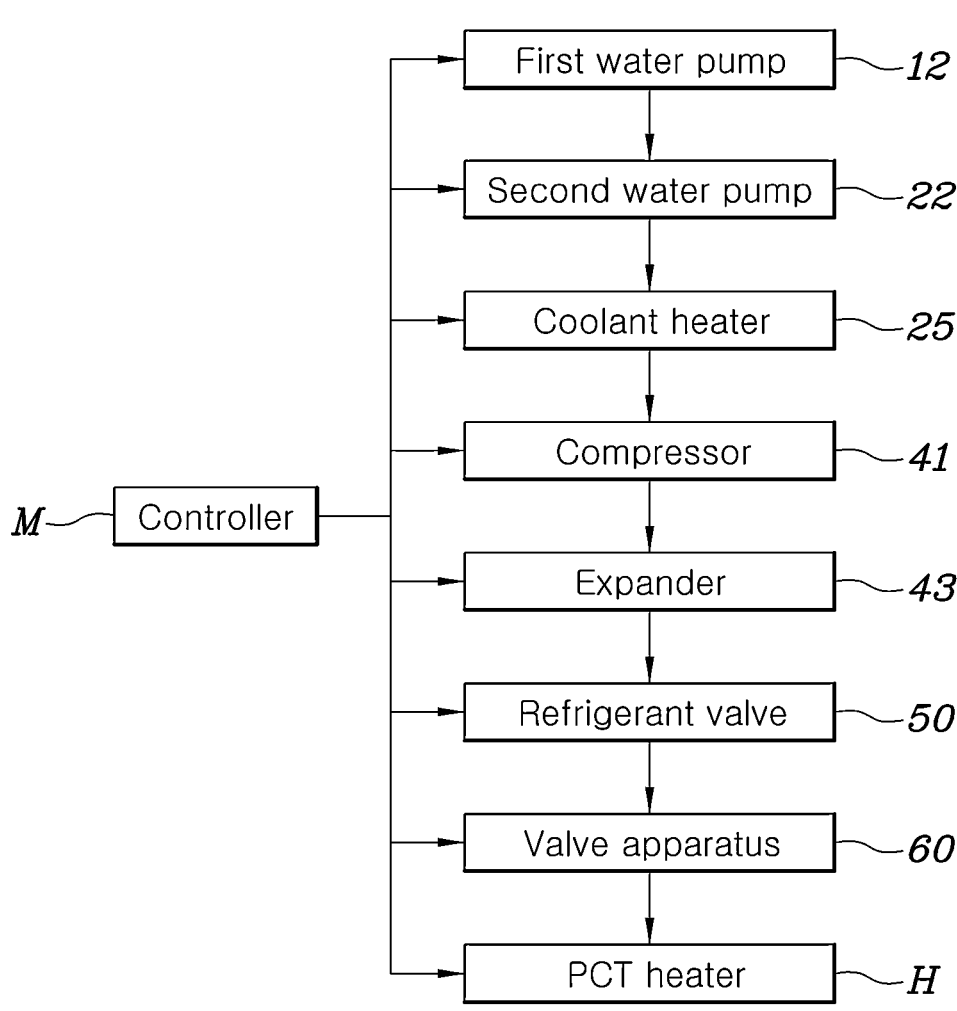
FIG. 6 is a flowchart showing an integrated thermal management system according to embodiments of the present disclosure.
Figure 7:
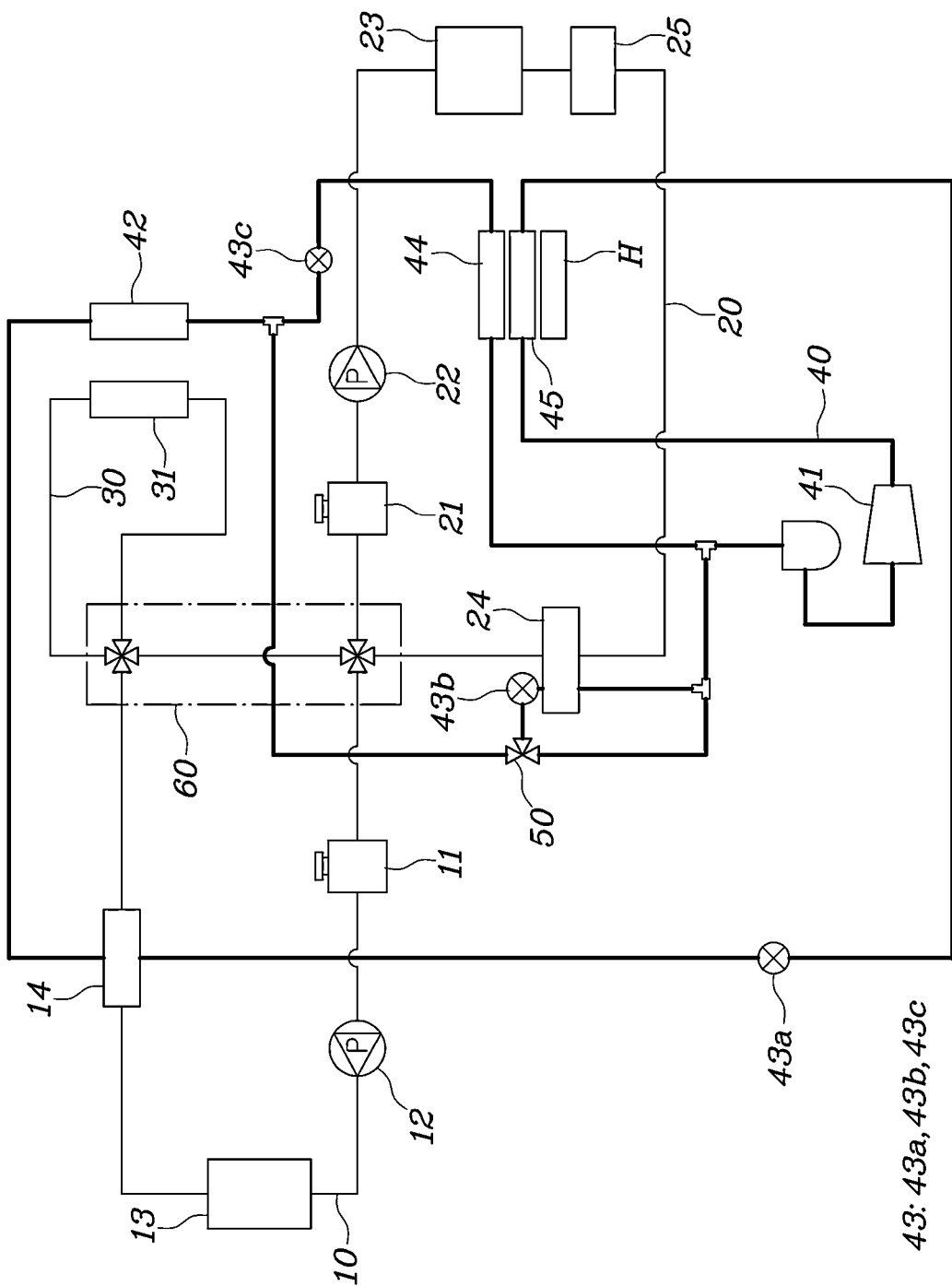
FIG. 7 is a circuit view showing the integrated thermal management system according to an embodiment of the present disclosure.
Figure 8:
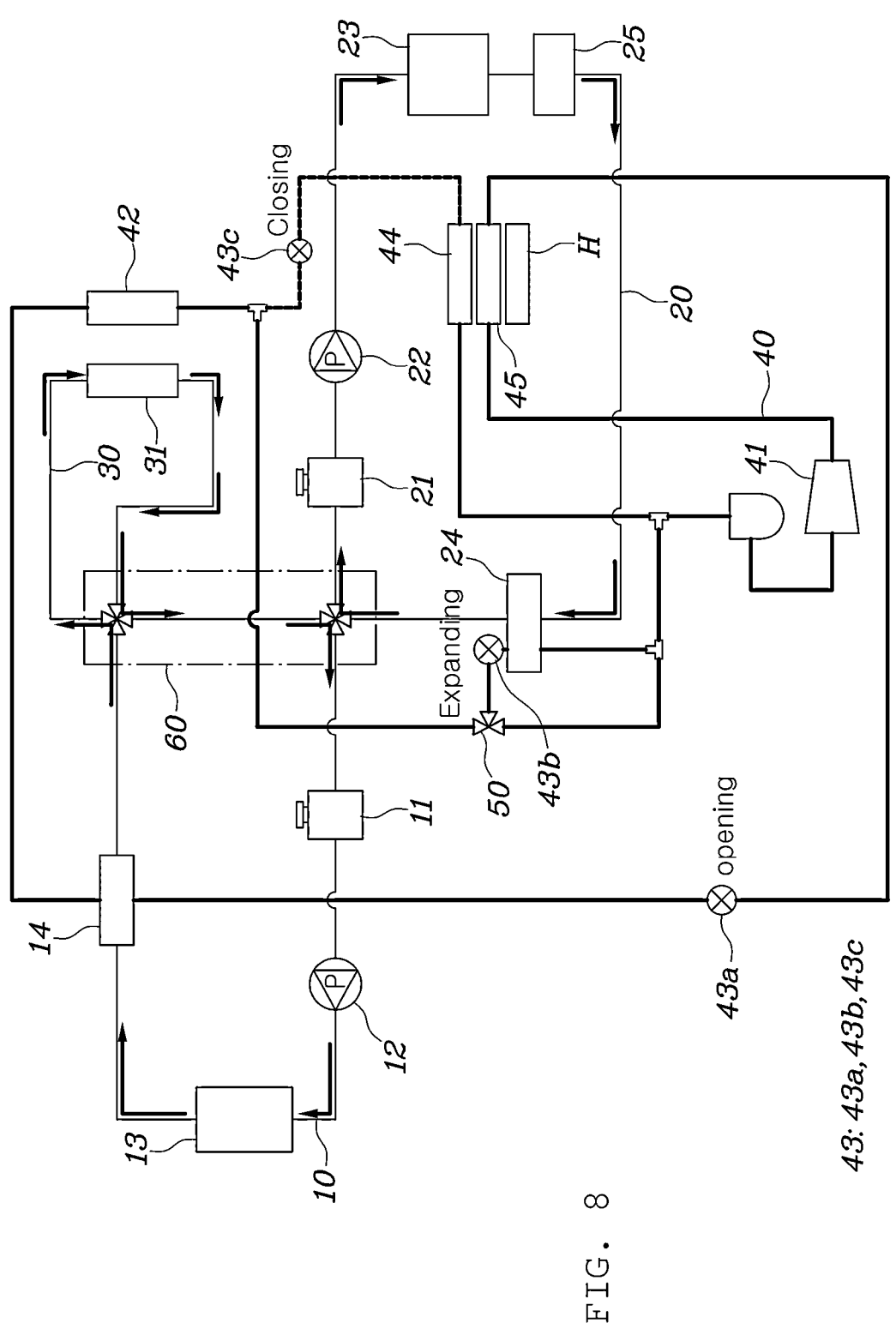
FIG. 8 is a view showing a thermal management mode of the integrated thermal management system according to embodiments of the present disclosure.
Figure 9:
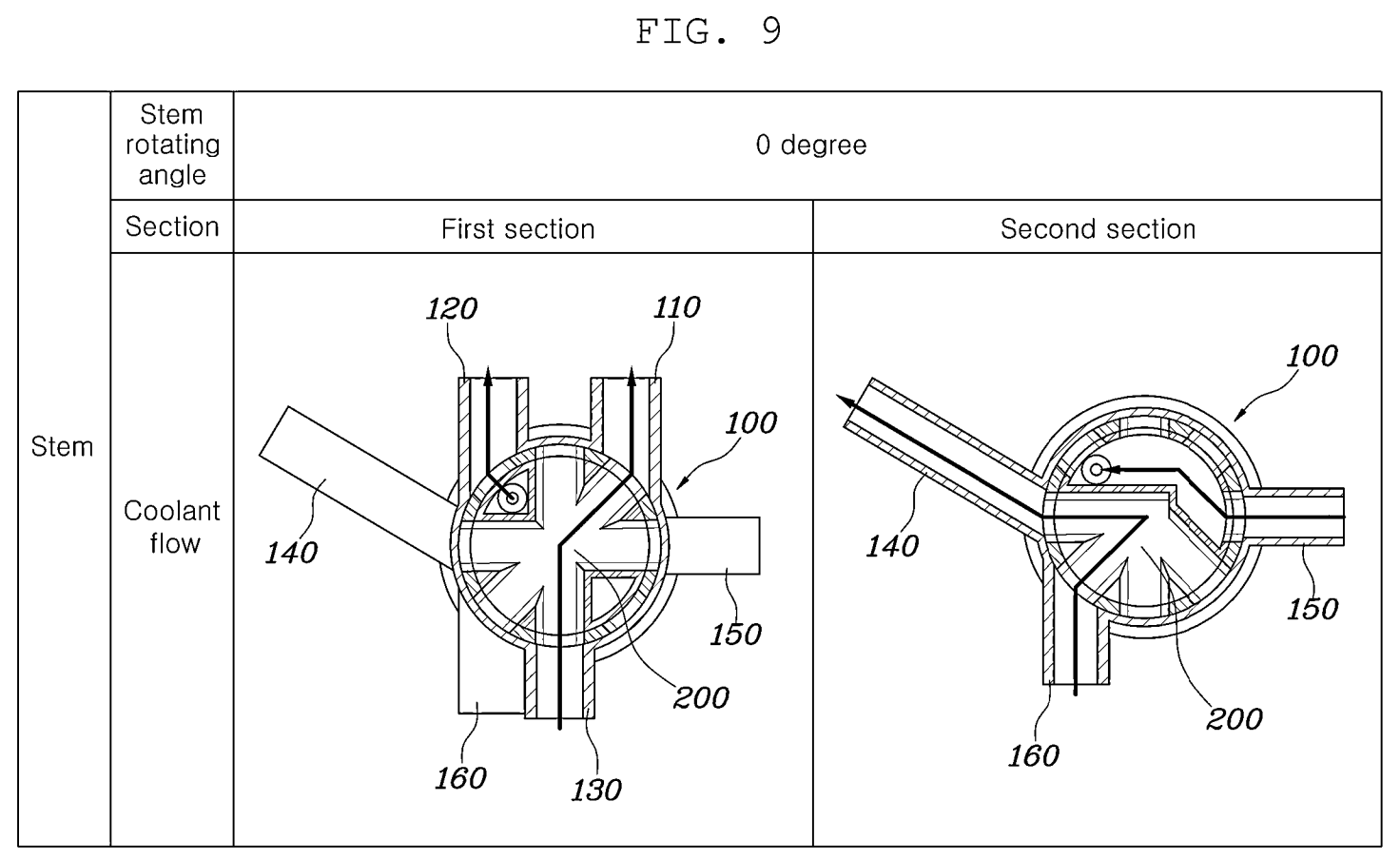
Figure 10:
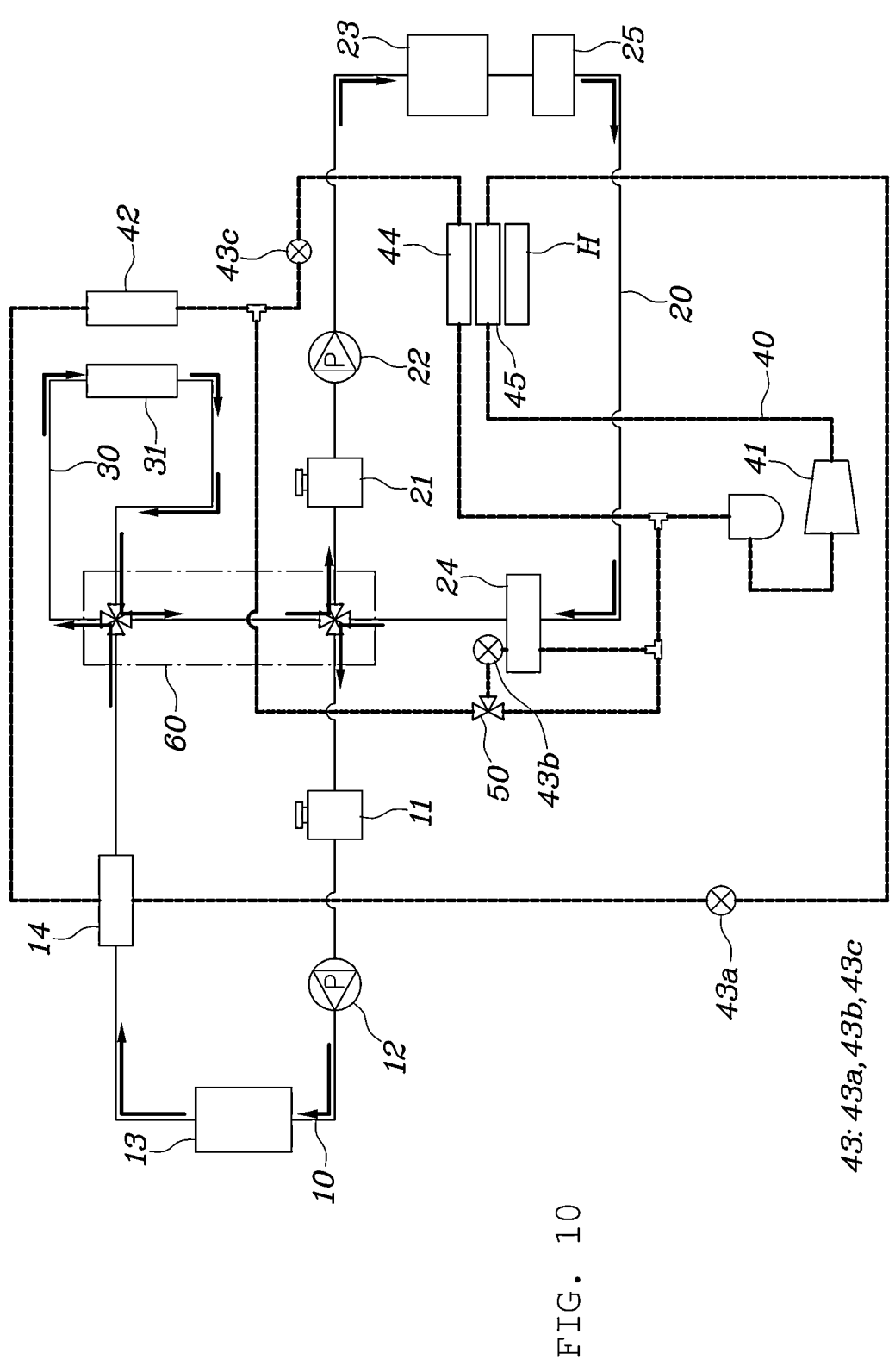
FIG. 10 is a view showing another thermal management mode of the integrated thermal management system according to embodiments of the present disclosure.
Figure 11:
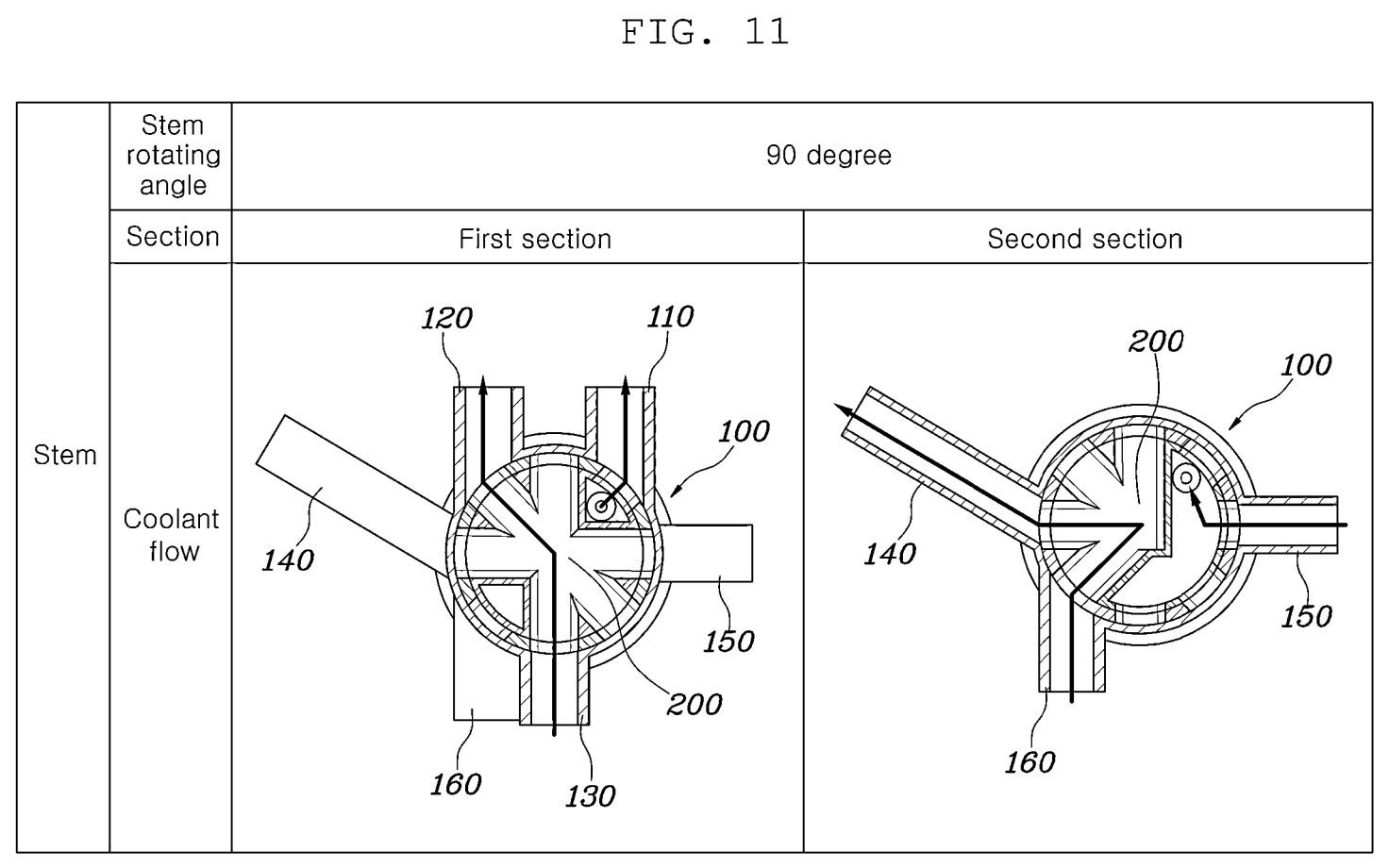
Figure 12:
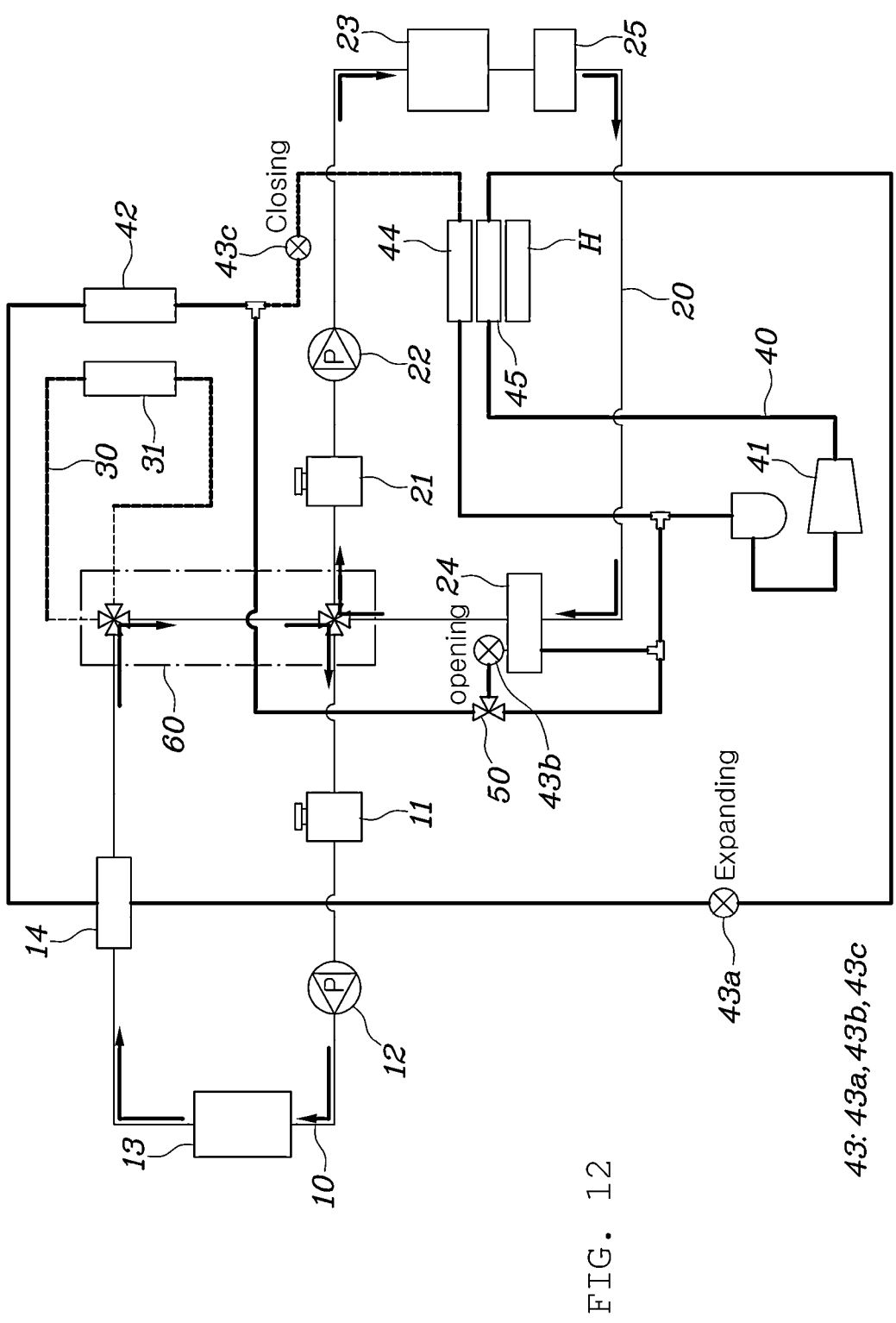
FIG. 12 is a view showing a further thermal management mode of the integrated thermal management system according to embodiments of the present disclosure.
Figure 13:
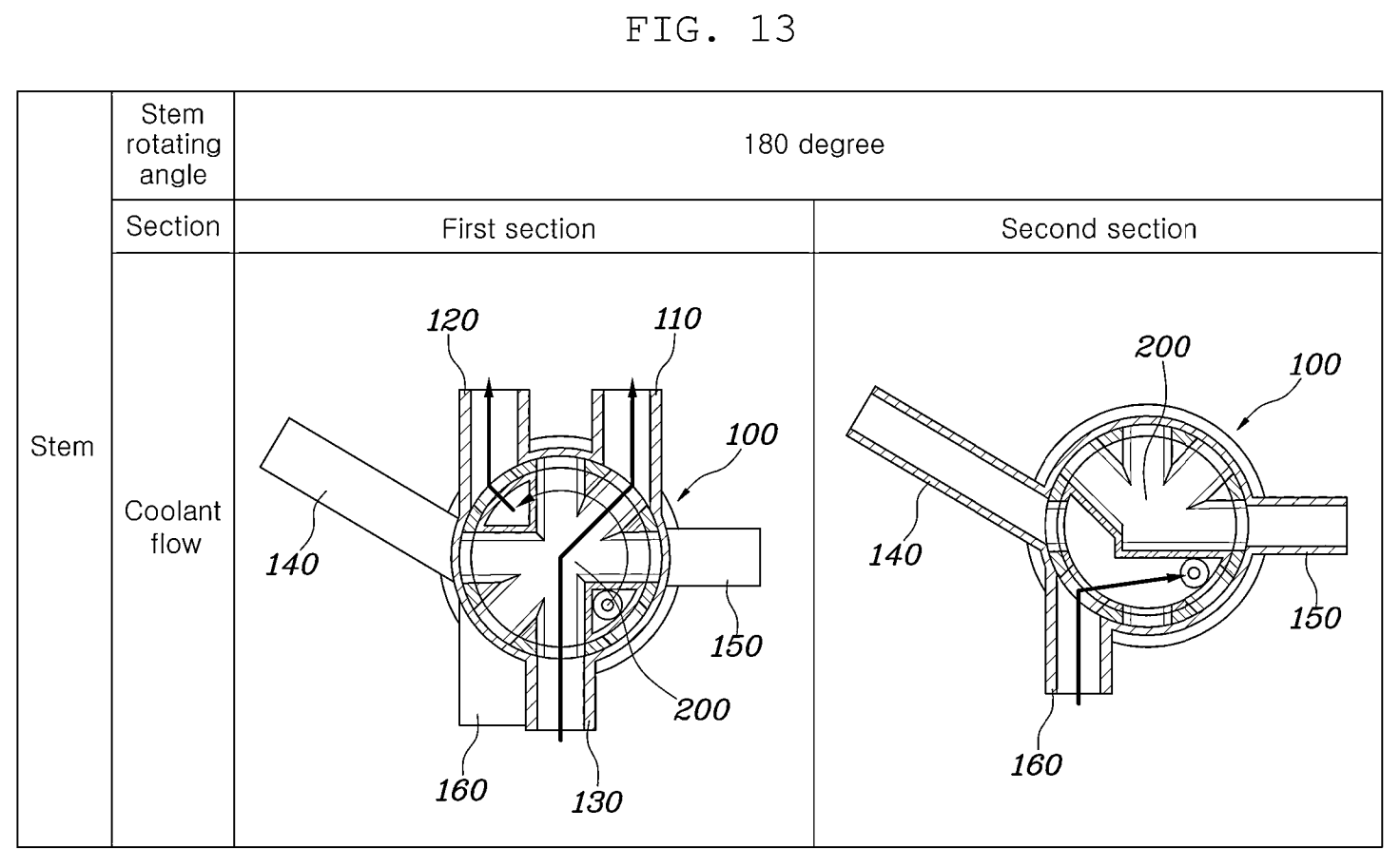
Figure 14:
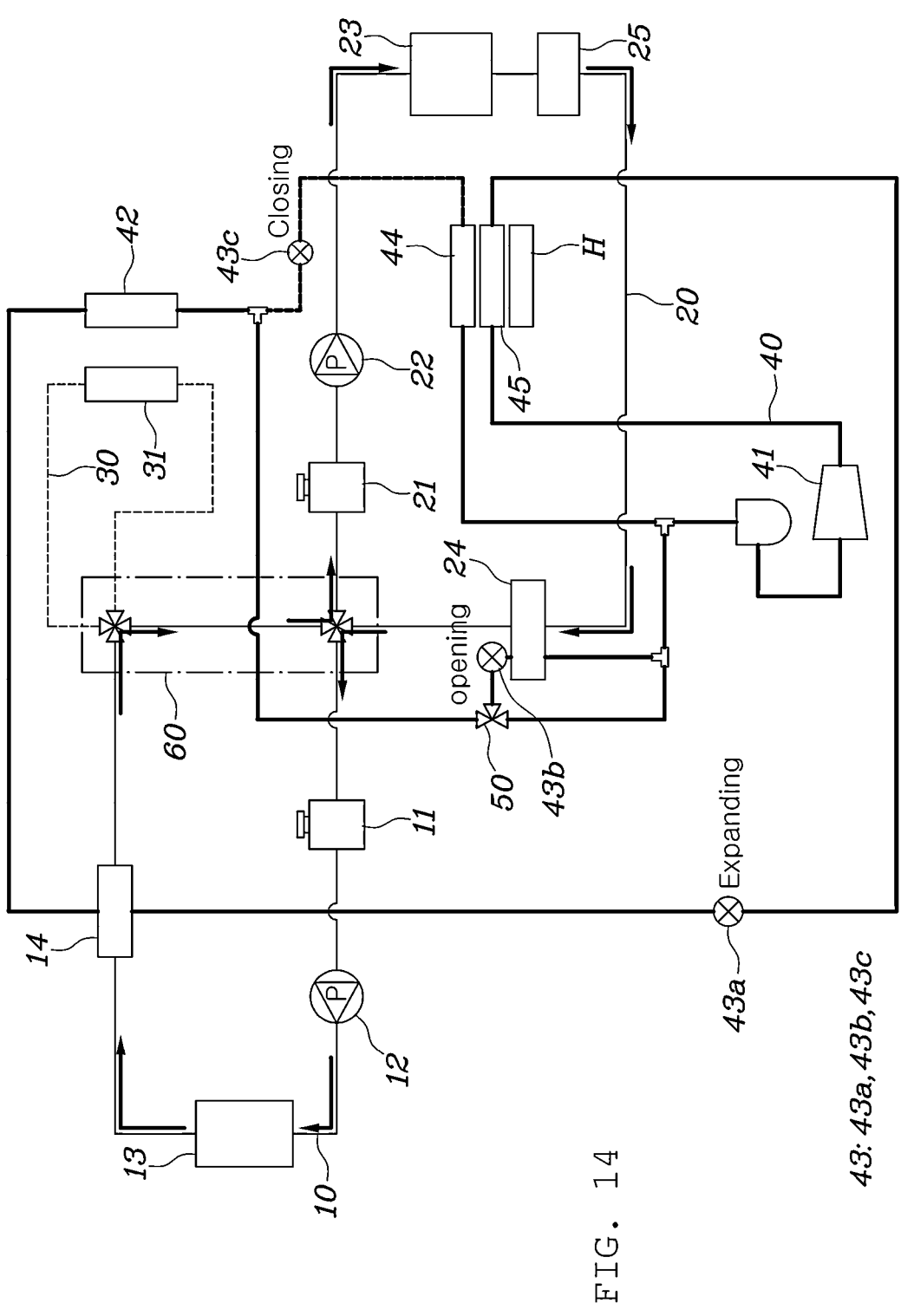
FIG. 14 is a view showing a further thermal management mode of the integrated thermal management system according to embodiments of the present disclosure.

FIG. 6 is a flowchart showing an integrated thermal management system according to embodiments of the present disclosure. FIG. 7 is a circuit view showing the integrated thermal management system according to an embodiment of the present disclosure. FIG. 8 is a view showing a thermal management mode of the integrated thermal management system according to embodiments of the present disclosure. FIG. 9 is a view showing the valve apparatus according to the thermal management mode shown in FIG. 8. FIG. 10 is a view showing another thermal management mode of the integrated thermal management system according to embodiments of the present disclosure. FIG. 11 is a view showing the valve apparatus according to the thermal management mode shown in FIG. 10. FIG. 12 is a view showing a further thermal management mode of the integrated thermal management system according to embodiments of the present disclosure. FIG. 13 is a view showing the valve apparatus according to the thermal management mode shown in FIG. 12. FIG. 14 is a view showing a further thermal management mode of the integrated thermal management system according to embodiments of the present disclosure. FIG. 15 is a view showing the valve apparatus according to the thermal management mode shown in FIG. 14.

According to embodiments of the present disclosure, as shown in FIGS. 1 to 5, the valve apparatus includes: a housing 100 having an internal space, of which a circumferential surface is divided into a first section S1 and a second section S2 and each of the first section S1 and the second section S2 has a plurality of ports; a stem 200 rotatably provided in the internal space of the housing 100, and including a plurality of first flow paths 210 matching with the plurality of ports of the first section S1, a plurality of second flow paths 220 matching with the plurality of ports of the second section S2, and a communication part 230 configured to allow the plurality of ports of the first section S1 and the plurality of ports of the second section S2 to communicate with each other; an actuator 300 provided at the housing 100 and configured to control a rotating position of the stem 200; and a seal 400 interposed between the housing 100 and the stem 200, and having a plurality of through holes 410 matching with the first flow paths 210, the plurality of second flow paths 220, and the communication part 230 of the stem 200.

In other words, a valve apparatus 60 according to embodiments of the present disclosure includes the housing 100, the stem 200, the actuator 300, and the seal 400, and the stem 200 and the seal 400 are provided in the internal space of the housing 100 and a distribution direction of a coolant through each port is changed in response to a rotating position of the stem 200. Furthermore, the actuator 300 is installed outside the housing 100, and a rotating shaft of the stem 200 is connected to the actuator 300 and the rotating position of the stem 200 is adjusted by operation of the actuator 300.

Here, the housing 100 has the plurality of ports through which the coolant is distributed, and each of the ports is formed by being divided into the first section S1 and the second section S2. The first section S1 and the second section S2 of the housing 100 are arranged to be spaced apart from each other in a longitudinal direction, and a plurality of ports is formed in the first section S1 along a circumference of the housing 100, and remaining ports are formed in the second section S2 along the circumference of the housing 100. Therefore, the distribution direction of the coolant through each of the ports may be changed in response to the rotating position of the stem 200.

The stem 200 has the plurality of first flow paths 210 matching with the ports of the first section S1 and the plurality of second flow paths 220 matching with the ports of the second section S2. The communication part 230 is provided to allow the ports of the first section S1 and the ports of the second section S2 to selectively communicate with each other, so that the coolant distributed through each of a first port 110 and a second port 120 may be mixed together or be separately distributed. In other words, according to embodiments of the present disclosure, the one stem 200 provides a coolant flow, through which the coolant is distributed into each of the ports corresponding to the first section S1 of the housing 100 and the ports corresponding to the second section S2 thereof, so that thermal management parts are modularized with the one valve apparatus 60 as the center, thereby reducing the entire package.

The seal 400 is interposed between the housing 100 and the stem 200, so that rotating movement of the stem 200 is stabilized, and the flowability of the coolant through specific distribution hole and port may be secured in response to the rotating position of the stem 200. The seal 400 is divided into a first seal 400a and a second seal 400b, so that the assembly convenience of the housing 100 and the stem 200 can be secured. Furthermore, the first seal 400a and the second seal 400b may be formed equal to each other to be symmetric, and an area of the plurality of through holes 410 may be formed larger than an area of a distribution hole, so that the design freedom can be secured. Furthermore, the seal 400 is provided to have the equal repulsive power on the entire area as the through holes 410 are arranged at equal gaps, so that the sealing performance and the durability can be improved.

In describing the valve apparatus 60 in detail, the ports of the housing 100 may include, in the first section S1, the first port 110 connected to a reservoir 11 at an electric part, the second port 120 connected to a reservoir 21 at a battery, and a third port 130 connected to a battery chiller 24, and in the second section S2, a fourth port 140 and a fifth port 150 respectively connected to an inlet and an outlet of a radiator 31, and a sixth port 160 connected to an electric part heat exchanger 14.

As described above, the valve apparatus 60 according to embodiments of the present disclosure may include a six-way valve as the housing 100 has 6 ports, and the coolant is distributed through each of the ports, and the distribution direction of the coolant through each of the ports is changed in response to the rotating position of the stem 200. Therefore, according to embodiments of the present disclosure, with the one valve apparatus 60, the distribution direction of the coolant may be changed with respect to a plurality of circuits through which the coolant is distributed.

Specifically, each of the ports is connected to the housing 100 and integrated with each other, so that when providing the coolant circuit, the coolant may be distributed into each coolant part without a separate branching tube, and there is an advantage in the entire module package. In the thermal management system to be described below, the above structure is provided to implement a thermal management mode in response to the coolant distribution among the electric part heat exchanger 14 and the radiator 31, and to secure the efficiency of the modularization of each coolant part.

Meanwhile, in response to the rotating position of the stem 200, the first flow paths 210 are configured to be opened to the third port 130 in normal time, to be selectively opened to any one of the first port 110 and the second port 120, and in the first section S1, the communication part 230 is configured to be opened to a remaining one of the first port 110 and the second port 120.

For example, as shown in FIG. 4, the first flow paths 210 may include 6 paths so as to selectively match with the ports in the first section S1, and each when the stem 200 is rotated by a predetermined angle, the first flow paths 210 are respectively connected to the first port 110, the second port 120, and the third port 130, so that a flow of the coolant in the first section S1 can be formed. Here, the first flow paths 210 of the stem 200 are configured to be opened to the third port 130 connected to the battery chiller 24, in normal time, and to be selectively opened to any one of the first port 110 and the second port 120. Therefore, the distribution direction of the coolant can be changed into the first port 110 and the second port 120.

Meanwhile, in response to a rotating position of the stem 200, the plurality of second flow paths 220 is configured to be opened to the sixth port 160 in normal time, and to be selectively opened to the fourth port 140 and the fifth port 150.

For example, as shown in FIG. 5, the plurality of second flow paths 220 may include 4 paths so as to match with each port in the second section S2, and each when the stem 200 is rotated by a predetermined angle, as the plurality of second flow paths 220 is selectively connected to the fourth port 140 and the fifth port 150, a flow in which the coolant is distributed is formed in the second section S2. Here, the plurality of second flow paths 220 of the stem 200 is configured to be opened to the sixth port 160 connected to the electric part heat exchanger 14, in normal time, and to be selectively opened to the fourth port 140 and the fifth port 150.

Specifically, the stem 200 is configured such that the communication part 230 is opened to a remaining one of the first port 110 and the second port 120 in the first section S1, the remaining port being in non-matching state with the first flow paths 210, to form a flow through which the coolant is distributed from the second section S2 to the first section S1, and the communication part 230 is selectively opened to the first port 110 or the second port 120 in the second section S2.

Accordingly, in response to the rotating position of the stem 200, the coolant flowing from the second section S2 into the sixth port 160 may be selectively distributed from the first section S1 into the first port 110 or the second port 120. Accordingly, in embodiments of the present disclosure, the stem 200 is configured to selectively distribute the coolant introduced through the third port 130 connected to the battery chiller 24 or the sixth port 160 connected to electric part heat exchanger 14 into the first port 110 connected to the reservoir 11 at the electric part or the second port 120 connected to the reservoir 21 at the battery, so that a coolant flow and heat exchange of a coolant in response to a thermal management mode can be variously implemented.

Therefore, embodiments of the present disclosure can be compact by integrating the plurality of coolant circuits with the one valve apparatus 60.

Meanwhile, the thermal management system using the valve apparatus 60 according to embodiments of the present disclosure described above will be described below.

According to embodiments of the present disclosure, as shown in FIGS. 6 and 7, the integrated thermal management system includes: a first coolant line 10 in which a coolant is circulated and including the reservoir 11 at the electric part, a first water pump 12, the electric part, and the electric part heat exchanger 14; a second coolant line 20 in which the coolant is circulated, and including the reservoir 21 at the battery, a second water pump 22, the battery 23, and the battery chiller 24; a third coolant line 30 branching from the first coolant line 10, and including the radiator 31; and a refrigerant line 40 in which a refrigerant is circulated, and including a compressor 41, an outdoor condenser 42, an expander 43, and an evaporator 44, and connected to both of the electric part heat exchanger 14 and the battery chiller 24 to allow heat exchange between the refrigerant and the coolant; a refrigerant valve 50 provided in rear of the outdoor condenser 42 in the refrigerant line 40 and configured to selectively distribute the refrigerant into the battery chiller 24 and the compressor 41; and the valve apparatus 60 configured to selectively change a distribution direction of the coolant distributed into the first coolant line 10, the second coolant line 20, and the third coolant line 30 to control a flow of the coolant.

In embodiments of the present disclosure, the radiator 31 and the outdoor condenser 42 are integrated with each other, so that the radiator 31 and the outdoor condenser 42 may perform heat exchange with external air.

Furthermore, the refrigerant line 40 includes an indoor condenser 45 between the compressor 41 and the reservoir 11 at the electric part, thereby adjusting the temperature of conditioning air to be supplied into the indoor space through the indoor condenser 45. The indoor condenser 45 may be used to supply heating air into the indoor space, and a PTC heater H may be provided to supplement indoor heating energy.

Furthermore, the expander 43 of the refrigerant line 40 may include a plurality of expanders including a first expander 43a located between the indoor condenser 45 and the reservoir 11 at the electric part, a second expander 43b located between the outdoor condenser 42 and the battery chiller 24, and a third expander 43c located before the evaporator 44. Here, the first expander 43a and the second expander 43b are respectively configured to perform heat exchange between the coolant and the refrigerant in the reservoir 11 at the electric part and the battery chiller 24 in response to each thermal management mode, and the third expander 43c may be configured to supply cooling air into the indoor space through the evaporator 44.

Each of the valve, the water pumps, the compressor 41, the expander 43, and the PTC heater H are configured to be controlled by a controller M in response to each thermal management mode, and thus operation thereof may be determined. Here, the thermal management mode may include a cooling/heating mode for the electric part 13, a cooling/heating mode for the battery 23, and a cooling/heating mode for the indoor space. In detail, in cooling/heating the electric part 13, the battery 23, or the indoor space, the thermal management mode may include a mode in which cooling/heating is performed using external air, a mode in which cooling/heating is performed using a refrigerant, and a mode in which cooling/heating is performed using external air and a refrigerant.

Meanwhile, in the first coolant line 10, when the first water pump 12 is operated, the coolant performs heat exchange while being circulated into the reservoir 11 at the electric part, the electric part 13, and the electric part heat exchanger 14, and in the second coolant line 20, when the second water pump 22 is operated, the coolant performs heat exchange while being circulated into the reservoir 21 at the battery, the battery 23, and the battery chiller 24. Here, the second coolant line 20 includes a coolant heater 25, thereby adjusting the temperature of the coolant circulated in the second coolant line 20. Furthermore, the coolant is selectively distributed into the third coolant line 30 to perform heat exchange and perform heat exchanged with the radiator 31.

The first coolant line 10, the second coolant line 20, the third coolant line 30 are connected to each other by the valve apparatus 60 as the medium according to embodiments of the present disclosure, and in response to coolant flow control of the valve apparatus 60, the refrigerant may be independently circulated in the first coolant line 10 and the second coolant line 20, or may be circulated while being integrated with the first coolant line 10 and the second coolant line 20. Furthermore, the coolant may be selectively distributed even into the third coolant line 30.

Accordingly, the valve apparatus 60 is configured to change the distribution direction of the coolant from a merging point of the first coolant line 10 and the second coolant line into the reservoir 11 at the electric part, the reservoir 21 at the battery, the electric part heat exchanger 14, and the battery chiller 24, and to allow the coolant passing through the electric part heat exchanger 14 to be distributed into or bypass the radiator 31 from a merging point of the first coolant line 10 and the third coolant line 30.

In other words, the first coolant line 10 and the third coolant line 30 are connected to the first port 110, the fourth port 140, the fifth port 150, and the sixth port 160 to constitute a coolant circuit, and the second coolant line is connected to the second port 120 and the third port 130 of the valve apparatus to constitute a coolant circuit.

Accordingly, in the conventional system, a plurality of valves is provided so as to distribute coolant among coolant parts, the entire package thereof increases, but in embodiments of the present disclosure, the distribution direction of the coolant with respect to each coolant parts is changed with the one valve apparatus 60, so that the entire package thereof may be reduced. Specifically, embodiments of the present disclosure can secure the package thereof and the design freedom by having the integrated module with the one valve apparatus 60.

Meanwhile, in the refrigerant line 40, when the compressor 41 is operated, the refrigerant performs heat exchange with the coolant circulated in the first coolant line 10 through the indoor condenser 45, the reservoir 11 at the electric part, the outdoor condenser 42, the battery chiller 24, each of the expanders, and the electric part heat exchanger 14 or performs heat exchange with the coolant circulated into the second coolant line 20 through the battery chiller 24.

Accordingly, the integrated thermal management system according to embodiments of the present disclosure is configured to control the distribution direction of the coolant circulated in the first coolant line 10, the second coolant line 20, and the third coolant line 30 by operation of the valve apparatus 60, and to control heat exchange between the coolant and the refrigerant circulated in the refrigerant line by operation of the refrigerant valve 50, so that the optimal thermal management mode for each situation can be performed.

Meanwhile, in embodiments of the present disclosure, the reservoir 11 at the electric part is provided in front of the first water pump 12, and the reservoir 21 at the battery is provided in front of the second water pump 22, so that the coolant management of each of the first coolant line 10 and the second coolant line 20 is easily performed. Specifically, when the reservoir 11 at the electric part and the reservoir 21 at the battery are respectively arranged in front of the first water pump 12 and the second water pump 22, installation positions of each water pump and each reservoir may be divided in each coolant line, so that the entire module package can be easily provided. Furthermore, as each reservoir is arranged at a front end of each water pump, the air vent performance performed through each reservoir is improved, and it is possible to easily integrate the reservoir and the valve into the integrated module.

With each configuration according to embodiments of the present disclosure described above, an embodiment according to the thermal management mode will be described below. Hereinbelow, the embodiment will be described in detail.

As shown in FIG. 8, when cooling the electric part 13 by external air, the controller M operates the first water pump 12, and controls the valve apparatus 60 so that the coolant is circulated into each of the first coolant line 10 and the second coolant line 20 and the coolant is distributed into radiator 31.

In other words, when cooling the electric part 13 by external air, the coolant flowing through the first coolant line 10 while cooling the electric part 13 by operation of the first water pump 12 performs heat exchange with external air through the radiator 31 to be cooled, and the coolant cooled through the radiator 31 is re-circulated into the electric part 13, so that heat exchange between the coolant and external air is pertained, thereby cooling the electric part 13. As the first coolant line 10 and the second coolant line 20 are divided from each other by the valve apparatus 60, the coolant is circulated only into the first coolant line 10, and the coolant may be distributed into the radiator 31. At this time, the radiator 31 is configured to improve the cooling efficiency of the coolant with a fan thereof being operated.

Meanwhile, when cooling the battery 23, the controller M operates the second water pump 22, and with the compressor 41 being operated, the controller M controls the refrigerant valve 50 to distribute the refrigerant into the battery chiller 24, and controls the first expander 42a to be opened and the second expander 43b to perform expanding operation.

In other words, when the electric part 13 is cooled by external air or simultaneously the battery 23 is cooled by the refrigerant, the coolant cooling the electric part 13 by operation of the first water pump 12 passes through the radiator 31 and is cooled while performing heat exchange with external air, and the coolant cooled through the radiator 31 is re-circulated toward the electric part 13. As the first coolant line 10 and the second coolant line 20 are separated from each other by the valve apparatus 60, the coolant is circulated only into the first coolant line 10 and the coolant is distributed toward the radiator 31.

In addition, as the compressor 41 is operated, the compressed refrigerant is condensed through the indoor condenser 45, the reservoir 11 at the electric part, and the outdoor condenser 42, and the second expander 43b performs expanding operation, so that heat exchange is performed between the refrigerant and the coolant through the battery chiller 24 and cooling of the coolant is performed. Accordingly, the coolant cooled through the battery chiller 24 in the second coolant line 20 may be distributed into the battery 23 and cool the battery 23. Here, as the second water pump 22 is operated, the coolant is circulated in the second coolant line 20, the refrigerant valve 50 changes a distribution flow of the refrigerant toward the second expander 43b and the battery chiller 24 after the outdoor condenser 42, and the first expander 42a may be changed into a full open state.

As described above, according to embodiments of the present disclosure, the electric part 13 can be cooled by heat exchange between external air and the coolant, and the battery 23 can be cooled by heat exchange between the coolant and the refrigerant.

As described above, as an embodiment of the valve apparatus, as shown in FIG. 9, a flow of the coolant is formed from the third port 130 to the second port 120 through the first flow paths 210 of the stem 200, and a flow of the coolant is formed from the sixth port 160 to the fourth port 140 through the plurality of second flow paths 220. Furthermore, a flow of the coolant is formed from the fifth port 150 to the first port 110 through the communication part 230 of the stem 200. Accordingly, as described above, the thermal management mode of cooling of the electric part by external air or cooling of the battery by the battery chiller can be implemented.

Meanwhile, in indoor cooling, the controller M may control the third expander 43c to perform expanding operation. In other words, when the third expander 43c is in a closed state, the distribution of the refrigerant toward the evaporator 44 is blocked, but when the third expander 43c is in an opened state, the refrigerant is distributed toward the evaporator 44 so as to cool conditioning air through the evaporator 44. In other words, in the mode in which the electric part 13 is cooled by external air and simultaneously the battery 23 is cooled by the refrigerant, some of the refrigerant passing through the outdoor condenser 42 is distributed into the evaporator 44 so as to cool the indoor space.

Meanwhile, when cooling the battery 23 and the electric part 13 by external air, the controller M operates the first water pump 12 and the second water pump 22, and controls the valve apparatus 60, so that the coolant passing through the battery 23 and the battery chiller 24 is distributed into the electric part 13 and the reservoir 11 at the electric part, and the coolant is distributed into the radiator 31.

As shown in FIG. 10, when cooling the battery 23 and the electric part 13 by external air, the valve apparatus 60 allows the first coolant line 10 and the second coolant line 20 to perform one coolant distribution path, so that the coolant is distributed in the first coolant line 10 and the second coolant line 20 while being shared. Furthermore, the coolant is distributed into the radiator 31 by the valve apparatus 60. Accordingly, when the first water pump 12 and the second water pump 22 are operated, the coolant primarily cooling the battery 23 secondarily cools the electric part 13, and the coolant cooling the battery 23 and the electric part 13 is cooled through the radiator 31 and is circulated so as to re-cool the battery 23 and the electric part 13. At this point, as circulation of the refrigerant in the refrigerant line 40 is prevented, heat exchange between the refrigerant and the coolant through the reservoir 11 at the electric part and the battery chiller 24 is prevented. Therefore, according to embodiments of the present disclosure, the coolant is cooled through the radiator 31 only by external air, so that the battery 23 and the electric part 13 are cooled by external air.

Accordingly, as an embodiment of the valve apparatus 60, as shown in FIG. 11, a flow of the coolant is formed from the third port 130 to the first port 110 through the first flow paths 210 of the stem 200, and a flow of the coolant is formed from the sixth port 160 to the fourth port 140 through the plurality of second flow paths 220. Furthermore, a flow of the coolant is formed from the fifth port 150 to the second port 120 through the communication part 230 of the stem 200. Therefore, as described above, the heat thermal management mode cooling the battery and the electric part by external air can be implemented.

Meanwhile, as shown in FIG. 12, when recovering waste heat of the electric part 13 and heating the indoor space, the controller M operates the first water pump 12, controls the valve apparatus 60 such that the coolant is circulated into each of the first coolant line 10 and the second coolant line and the coolant bypasses the radiator 31, and with the compressor 41 being operated, the controller M controls the first expander 43a to expand and the second expander 43b and the third expander 43c to be closed. At this point, the controller M may control the refrigerant valve 50 such that the refrigerant passing through the indoor condenser 45 is distributed into the compressor 41.

In other words, when heating the indoor space, the refrigerant in the high pressure and high temperature state spilled from the compressor 41 flows into the indoor condenser and is condensed in the indoor condenser 45 and emits heat, and as external air or indoor air passes through the indoor condenser 45, the temperature of the air increases by performing heat exchange with the emitted heat and then the air is supplied into the indoor space to heat the indoor space. At this point, in order to supplement the indoor heating, the PTC heater H may be operated together.

In addition, when the first expander 43a expands in the refrigerant line 40 and the second expander 43b is opened and the third expander 43c is closed, the refrigerant passing through the indoor condenser 45 expands in the first expander 43a and then perform heat exchange with the coolant in the first coolant line 10 through the electric part heat exchanger 14, so that the coolant is cooled. Therefore, the electric part 13 may be cooled by the coolant circulated in the first coolant line 10 by operation of the first water pump 12, and the coolant heated while cooling the electric part 13 is cooled at the reservoir 11 at the electric part exchanges heat with the refrigerator, so that evaporation is efficiently performed. Furthermore, since the coolant in the first coolant line is not circulated into the radiator 31, heat exchange between the refrigerant and the coolant in the reservoir 11 at the electric part is secured, and the third expander 43c performs closing operation and cooling air through the evaporator 44 is not generated.

Accordingly, as an embodiment of the valve apparatus 60, as shown in FIG. 13, a flow of the coolant is formed from the third port 130 to the second port 120 through the first flow paths 210 of the stem 200, and a flow of the coolant to the fourth port 140 and the fifth port 150 is blocked in the plurality of second flow paths 220. Furthermore, a flow of the coolant is formed from the sixth port 160 to the first port 110 through the communication part 230 of the stem 200. Therefore, as described above, the thermal management mode in which the indoor heating is performed by recovering waste heat of the electric part can be implemented.

Meanwhile, when cooling the battery 23 and heating the indoor space, the controller M stops operation of the first water pump 12, and operates the second water pump 22.

In other words, as in heating the indoor space, the refrigerant in the high pressure and high temperature state spilled from the compressor 41 flows into the indoor condenser and is condensed in the indoor condenser 45 and emits heat, and as external air or indoor air passes through the indoor condenser 45, the temperature of the air increases by performing heat exchange with the emitted heat and then the air is supplied into the indoor space to heat the indoor space. At this point, in order to supplement the indoor heating, the PTC heater H may be operated together.

Furthermore, in the refrigerant line 40, the first expander 43*a* expands, and the second expander 43*b* and the third expander 43*c* are closed, so that the refrigerant passing through the indoor condenser 45 expands in the first expander 43*a* and operation of the first water pump 12 is stopped. Therefore, heat exchange between the refrigerant and the coolant is not performed in the reservoir 11 at the electric part and heat exchange between the refrigerant and the coolant is performed in the battery chiller 24, so that the coolant in the second coolant line 20 is cooled. At this point, the refrigerant valve 50 may be controlled such that the refrigerant passing through the indoor condenser 45 is distributed toward the battery chiller 24, and the first expander 43*a* is opened and the second expander 43*b* performs expanding operation so that heat exchange between the coolant and the refrigerant may be performed in the battery chiller 24. Accordingly, indoor heating and cooling of the battery 23 can be performed simultaneously.

Meanwhile, as shown in FIG. 14, when heating the indoor space by using waste heat of the electric part 13 and the battery 23, the controller M operates the first water pump 12 and the second water pump 22, controls the valve apparatus 60 such that the coolant passing through the battery 23 and the battery chiller 24 is distributed into the electric part 13 and the reservoir 11 at the electric part, and with the compressor 41 being operated, the controller M controls the first expander 43*a* to perform expanding operation, and controls the refrigerant valve 50 such that the refrigerant passing through the condenser passes through the battery chiller 24 to be distributed into the compressor 41.

In other words, when heating the indoor space by using waste heat of the electric part 13 and the battery 23, the valve apparatus 60 allows the first coolant line 10 and the second coolant line 20 to perform one coolant distribution path, so that the coolant is distributed in the first coolant line 10 and the second coolant line 20 while being shared. Furthermore, as the coolant is prevented from being distributed toward the radiator 31, the coolant primarily cooling the battery 23 secondarily cools the electric part 13 by operation of each of the first water pump 12 and the second water pump 22.

Furthermore, the refrigerant in the high pressure and high temperature state spilled from the compressor 41 flows into the indoor condenser 45 and is condensed in the indoor condenser 45 and emits heat, and as external air or indoor air passes through the indoor condenser 45, the temperature of the air increases by performing heat exchange with the emitted heat and then the air is supplied into the indoor space to heat the indoor space. At this point, in order to supplement the indoor heating, the PTC heater H may be operated together.

Specifically, as the first expander 43*a* expands in the refrigerant line 40, the refrigerant compressed in the compressor 41 passes through the indoor condenser 45 and then expands in the first expander 43*a* and then performs heat exchange with the coolant in the first coolant line 10 by the electric part heat exchanger 14. Accordingly, the coolant circulated in the first coolant line 10 and the second coolant line 20 and performing heat exchange with the electric part 13 and the battery 23 performs heat exchange with the refrigerant through the reservoir 11 at the electric part, so that the refrigerant absorbs heat generated in the electric part 13 and the battery 23. As described above, the refrigerant absorbing heat of the electric part 13 and the battery 23 passes through the battery chiller 24 and then is distributed into the compressor 41, so that a differential pressure of the refrigerant system is reduced and the heating efficiency is improved.

Accordingly, as an embodiment of the valve apparatus 60, as shown in FIG. 16, a flow of the coolant is formed from the third port 130 to the first port 110 through the first flow paths 210 of the stem 200, and a flow of the coolant to the fourth port 140 and the fifth port 150 is blocked in the plurality of second flow paths 220. Furthermore, a flow of the coolant is formed from the sixth port 160 to the second port 120 through the communication part 230 of the stem 200. Therefore, as described above, the thermal management mode in which the indoor heating is performed by recovering waste heat of the electric part and the battery can be implemented.

The valve apparatus 60 having the above-described structure and the thermal management module using the same are configured such that the plurality of coolant circuits is integrated with the one valve to be compactified, so that the valve apparatus and the thermal management module are advantageous in terms of manufacturing and are improved in utilization of space while being compactified.

Furthermore, by heat exchange between the coolant circulated in each coolant line and the refrigerant circulated in the refrigerant line 40 performed in response to various thermal management modes, the efficiency of thermal management including cooling of the electric part 13 and the battery 23, and heating of the indoor space by using waste heat of the electric part 13 and the battery 23 is improved, thereby securing a traveling distance of an electrified mobility.

Embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Although embodiments of the present disclosure have been disclosed in detail only with respect to the above specific embodiments, those skilled in the art will appreciate that various modifications, additions, and substitutions are possible, without departing from the spirit and scope of the present disclosure, and it is appropriate that the various modifications, additions, and substitutions belong to the accompanying claims.

What is claimed is:

1. A valve apparatus comprising:
a stationary housing having a cylindrical internal space, and of which a circumferential surface is divided into a first section and a second section and each of the first section and the second section has a plurality of ports;
a stem having a cylindrical periphery and rotatably provided in the internal space of the housing, the stem comprising:
a plurality of first flow paths matching with the plurality of ports of the first section,
a plurality of second flow paths matching with the plurality of ports of the second section, and
a communication part defined as a hole monolithically formed in a body of the stem and extending along a rotational axis of the stem, the communication part being opened to one of the plurality of ports of the first section and in communication with one of the plurality of ports of the second section such that, based on a rotational angle, a flow of coolant is selectively switched among the plurality of ports of the first section, among the plurality of ports of the second section, or between the plurality of ports of the first section and the plurality of ports of the second section;

an actuator provided at the housing and configured to control a rotating position of the stem; and a seal interposed between the housing and the stem, and having a plurality of through holes matching with the plurality of first flow paths, the plurality of second flow paths, and the communication part of the stem.

2. The valve apparatus of claim 1, wherein each port of the housing comprises, in the first section, a first port connected to a first reservoir, a second port connected to a second reservoir, and a third port connected to a battery chiller, and in the second section, a fourth port and a fifth port respectively connected to an inlet and an outlet of a radiator, and a sixth port connected to an electric part heat exchanger.

3. The valve apparatus of claim 2, wherein, in response to the rotating position of the stem, the plurality of first flow paths is configured to be opened to the third port in normal time and to be selectively opened to any one of the first port and the second port, and in the first section, the communication part is configured to be opened to a remaining port of the first port and the second port.

4. The valve apparatus of claim 2, wherein in response to the rotating position of the stem, the plurality of second flow paths is configured to be opened to the sixth port in normal time and to be selectively opened to the fourth port and the fifth port, and in the second section, the communication part is configured to be selectively opened to the first port or the second port.

5. The valve apparatus of claim 1, wherein the seal is divided into a first seal and a second seal, and an area of each of the plurality of through holes is formed larger than an area of the plurality of first flow paths, an area of the plurality of second flow paths, and an area of the communication part.

6. An integrated thermal management system using a valve apparatus of claim 1, the integrated thermal management system comprising:

a first coolant line in which a coolant is circulated, and comprising a first reservoir, a first water pump, an electric part, and an electric part heat exchanger;

a second coolant line in which the coolant is circulated, and comprising a second reservoir, a second water pump, a battery, and a battery chiller;

a third coolant line branching from the first coolant line, and comprising a radiator;

a refrigerant line in which a refrigerant is circulated, comprising a compressor, an indoor condenser, an outdoor condenser, an evaporator, and a plurality of expanders comprising a first expander between the indoor condenser and the electric part heat exchanger, a second expander between the outdoor condenser and the battery chiller, and a third expander located before the evaporator, and connected to the electric part heat exchanger and the battery chiller to allow heat exchange between the refrigerant and the coolant;

a refrigerant valve provided downstream of the outdoor condenser in the refrigerant line and configured to allow the refrigerant to be selectively distributed into the battery chiller and the compressor; and the valve apparatus configured to selectively change a distribution direction of the coolant distributed in the first coolant line, the second coolant line, and the third coolant line to control a flow of the coolant.

7. The integrated thermal management system of claim 6, wherein the valve apparatus is configured to change a distribution direction of the coolant at a merging point of the first coolant line and the second coolant line into the first reservoir, the second reservoir, the electric part heat exchanger, and the battery chiller, and to allow the coolant passing through the electric part heat exchanger to be distributed into or bypass the radiator at a merging point of the first coolant line and the third coolant line.

8. The integrated thermal management system of claim 6, further comprising:

a controller configured to control the refrigerant valve, each of the first and second water pumps, the compressor, and each of the plurality of expanders in response to a thermal management mode.

9. The integrated thermal management system of claim 8, wherein when cooling the electric part with external air, the controller is configured to operate the first water pump, and control the valve apparatus to allow the coolant to be circulated into each of the first coolant line and the second coolant line, and to allow the coolant to be distributed into the radiator.

10. The integrated thermal management system of claim 9, wherein when cooling the battery, the controller is configured to operate the second water pump, and with the compressor being operated, control the refrigerant valve to allow the refrigerant to be distributed into the battery chiller, and control the first expander to be opened and the second expander to perform expanding operation.

11. The integrated thermal management system of claim 8, wherein when cooling an indoor space, the controller is configured to control the third expander to perform expanding operation.

12. The integrated thermal management system of claim 8, wherein when cooling the battery and the electric part by external air, the controller is configured to operate the first water pump and the second water pump, and control the valve apparatus to allow the coolant passing through the battery and the battery chiller to be distributed into the electric part and the electric part heat exchanger, and to allow the coolant to be distributed into the radiator.

13. The integrated thermal management system of claim 8, wherein when recovering waste heat of the electric part to heat an indoor space, the controller is configured to operate the first water pump, and control the valve apparatus to allow the coolant to be circulated into each of the first coolant line and the second coolant line, and to allow the coolant to bypass the radiator, and with the compressor being operated, the controller is configured to control the first expander to expand, and the second expander and the third expander to be closed.

14. The integrated thermal management system of claim 13, wherein when cooling the battery and heating the indoor space, the controller is configured to stop operation of the first water pump, and operate the second water pump.

15. The integrated thermal management system of claim 8, wherein when heating an indoor space by using waste heat of the electric part and the battery, the controller is configured to operate the first water pump and the second water pump, and control the valve apparatus to allow the coolant passing through the battery and the battery chiller to be distributed into the electric part and the electric part heat exchanger, and with the compressor being operated, the controller is configured to control the first expander to perform expanding operation, and control the refrigerant valve to allow the refrigerant passing through the outdoor condenser to pass through the battery chiller to be distributed into the compressor.

* * * * *